United States Patent
Hoffman et al.

(10) Patent No.: US 11,539,283 B1
(45) Date of Patent: Dec. 27, 2022

(54) SYSTEM AND METHOD FOR REDUCING DELAY IN THE MODULATION OF A MULTI-PHASE OUTPUT VOLTAGE FROM AN INVERTER

(71) Applicant: Rockwell Automation Technologies, Inc., Mayfield Heights, OH (US)

(72) Inventors: Jonathan D. Hoffman, Milwaukee, WI (US); Adam M. Shea, Fox Point, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/339,378

(22) Filed: Jun. 4, 2021

(51) Int. Cl.
*H02M 1/00* (2006.01)
*H02P 1/26* (2006.01)
(Continued)

(52) U.S. Cl.
CPC ..... *H02M 1/0025* (2021.05); *H02M 3/33576* (2013.01); *H02M 7/5387* (2013.01);
(Continued)

(58) Field of Classification Search
CPC ... H02M 1/0025; H02M 3/33576; H02P 1/26; H02P 6/18; H02P 6/20; H02P 21/18; H02P 27/08
See application file for complete search history.

(56) References Cited

U.S. PATENT DOCUMENTS

| | | | | |
|---|---|---|---|---|
| 5,909,098 A | * | 6/1999 | Konecny | H02P 27/08 318/811 |
| 7,049,771 B2 | * | 5/2006 | Katanaya | H02M 7/53875 318/599 |

(Continued)

FOREIGN PATENT DOCUMENTS

EP  3576286 A1  12/2019

OTHER PUBLICATIONS

Amann H. et al.; "Design Criteria for Low Cost Drives"; Electromotion '99, 3rd International Symposium on Advanced Electromechanical Motion Systems; Jul. 8-9, 1999; Patras, Greece; vol. II, Jul. 8, 1999, pp. 811-816, XP002758204 abstract; figures 8, 10, 11—(7) pages.

(Continued)

*Primary Examiner* — Yusef A Ahmed
(74) *Attorney, Agent, or Firm* — Boyle Fredrickson, SC

(57) ABSTRACT

A power converter is configured to measure an output current and to determine a multi-phase voltage reference as a function of the output current. Within the same switching period the voltage reference is determined, a modulation routine determines a modulation index for each phase of the output voltage. In some instances, one or more phases must start modulation during the switching period before the new modulation index is determined. The modulation routine stores the value of the modulation index generated from the prior switching period and uses the stored value when a new value is not yet ready. An offset value for the phase voltage which used a modulation index from the prior switching period is determined in order to compensate the phase voltages of the other phases and to maintain a desired line-to-line voltage output from the power converter.

20 Claims, 8 Drawing Sheets

(51) Int. Cl.
    *H02P 6/20*            (2016.01)
    *H02M 3/335*         (2006.01)
    *H02M 7/5387*       (2007.01)
    *H02P 6/18*            (2016.01)
    *H02P 21/18*         (2016.01)

(52) U.S. Cl.
    CPC ................ *H02P 1/26* (2013.01); *H02P 6/18* (2013.01); *H02P 6/20* (2013.01); *H02P 21/18* (2016.02)

(56) References Cited

U.S. PATENT DOCUMENTS

| | | | | |
|---|---|---|---|---|
| 7,276,877 | B2* | 10/2007 | Qiu | H02P 21/13 318/632 |
| 7,471,008 | B2* | 12/2008 | Stahlhut | H02P 9/305 290/52 |
| 8,330,405 | B2* | 12/2012 | Royak | H02P 21/00 318/700 |
| 8,604,732 | B2* | 12/2013 | Kawashima | H02P 27/08 318/400.06 |
| 8,963,453 | B2* | 2/2015 | Hong | H02M 1/14 318/599 |
| 9,318,976 | B1* | 4/2016 | Wei | H02M 5/4585 |
| 9,419,549 | B2* | 8/2016 | Yim | H02P 6/16 |
| 10,348,218 | B2* | 7/2019 | Kanazawa | H02M 7/493 |
| 11,031,897 | B1* | 6/2021 | Meyer | H02M 1/12 |
| 11,283,388 | B1* | 3/2022 | Sizov | H02P 21/06 |
| 2003/0062868 | A1* | 4/2003 | Mir | H02P 6/14 318/599 |
| 2005/0007044 | A1* | 1/2005 | Qiu | G05B 13/048 318/717 |
| 2007/0013325 | A1* | 1/2007 | Kiuchi | H02P 5/74 318/801 |
| 2007/0268728 | A1* | 11/2007 | Mohan | H02M 5/297 363/132 |
| 2009/0153086 | A1* | 6/2009 | Narumi | H02P 6/18 318/400.35 |
| 2010/0014335 | A1* | 1/2010 | Iwata | H02M 7/53875 363/132 |
| 2010/0320948 | A1* | 12/2010 | Royak | H03K 17/14 318/400.13 |
| 2011/0080125 | A1* | 4/2011 | Shimada | H02P 21/0003 318/400.09 |
| 2011/0133678 | A1* | 6/2011 | Tomigashi | H02P 27/08 318/400.04 |
| 2012/0014147 | A1* | 1/2012 | Radosevich | H02M 7/539 363/71 |
| 2012/0140532 | A1* | 6/2012 | Tallam | H02M 7/53875 363/37 |
| 2012/0153882 | A1* | 6/2012 | Hong | H02P 27/08 318/400.26 |
| 2012/0163046 | A1* | 6/2012 | Hibino | H02P 27/08 363/37 |
| 2012/0256580 | A1* | 10/2012 | Yu | H02P 1/28 318/779 |
| 2013/0194852 | A1* | 8/2013 | Nakano | H02M 7/53875 363/131 |
| 2014/0070755 | A1* | 3/2014 | Baek | H02P 27/08 318/798 |
| 2014/0197774 | A1* | 7/2014 | Liu | H02M 1/126 363/40 |
| 2014/0346984 | A1* | 11/2014 | Shiota | H02P 21/18 318/400.33 |
| 2014/0361613 | A1* | 12/2014 | Huang | H02M 1/14 307/12 |
| 2015/0002067 | A1* | 1/2015 | Nondahl | H02P 21/00 318/503 |
| 2015/0123579 | A1* | 5/2015 | Liu | H02P 21/06 318/400.05 |
| 2015/0188474 | A1* | 7/2015 | Kanchan | H02P 21/0089 318/400.02 |
| 2016/0173012 | A1* | 6/2016 | Nondahl | H02M 7/53873 318/400.34 |
| 2016/0248354 | A1* | 8/2016 | Liu | H02P 27/08 |
| 2017/0063269 | A1* | 3/2017 | Miklosovic | G05B 13/02 |
| 2018/0167004 | A1* | 6/2018 | Suzuki | H02P 6/28 |
| 2018/0248466 | A1* | 8/2018 | Pham | H02M 1/08 |
| 2018/0262110 | A1* | 9/2018 | Fukushima | H02M 3/156 |
| 2019/0101436 | A1* | 4/2019 | Li | G01R 31/343 |
| 2019/0393822 | A1* | 12/2019 | Ganesan | H02P 31/00 |
| 2020/0036287 | A1* | 1/2020 | Peretz | H03F 3/2171 |
| 2020/0166908 | A1* | 5/2020 | Lim | H02P 21/22 |
| 2021/0175818 | A1* | 6/2021 | Murai | H02M 7/797 |
| 2021/0359634 | A1* | 11/2021 | Tsuchiya | H02M 7/5395 |
| 2022/0115974 | A1* | 4/2022 | Kobayashi | H02M 1/32 |

OTHER PUBLICATIONS

Extended European Search Report dated Oct. 18, 2022; Application No. 22177018.3—(10) pages.

* cited by examiner

SYSTEM AND METHOD FOR REDUCING DELAY IN THE MODULATION OF A MULTI-PHASE OUTPUT VOLTAGE FROM AN INVERTER

BACKGROUND INFORMATION

The subject matter disclosed herein relates to a system and method for reducing delay in the modulation of a multi-phase output voltage from an inverter. More specifically, an improved modulation routine determines switching signals for each phase of the multi-phase output within the same switching period as feedback current is sampled and these switching signals are utilized within the same switching period to determine an output voltage for at least a portion of the phases of the multi-phase output voltage.

Power converters are widely used to supply voltages to loads at varying amplitudes and/or varying frequencies. A power converter may receive an input voltage in one form, such as an Alternating Current (AC) voltage or a Direct Current (DC) voltage, and output a voltage in a second form. One common application of power converters is a motor drive.

As is known to those skilled in the art, motor drives are utilized to control operation of a motor. According to one common configuration, a motor drive includes a DC bus having a DC voltage of suitable magnitude from which an AC voltage may be generated and provided to an AC motor. The DC voltage may be provided as an input to the motor drive or, alternately, the motor drive may include a converter section which converts an AC voltage input to the DC voltage present on the DC bus. The converter section may be passive, including conventional diode rectification, or active, including controlled power electronic switching devices, either of which may convert an AC voltage input to a DC voltage for the DC bus. The power electronic switching devices in an active rectifier may be selected from transistors, such as insulated gate bipolar transistors (IGBTs) or metal oxide semiconductor field-effect transistors (MOSFETs), thyristors, or silicon-controlled rectifiers (SCRs). The power electronic switching device may also include a reverse conduction power electronic device, such as a freewheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device in the active front end to generate a desired DC voltage on the DC bus.

The motor drive receives a command signal which indicates the desired operation of the motor. The command signal may be a desired torque, speed, or position at which the motor is to operate. The torque, speed, or position of the motor is controlled by varying the amplitude and frequency of the AC voltage applied to the stator of the motor. An inverter section is provided between the DC bus and the output of the motor drive to generate the controlled AC voltage. The inverter section includes power electronic switching devices, such as IGBTs, MOSFETs, thyristors, or SCRs, and a reverse conduction power electronic device connected in parallel across the power electronic switching device. The motor is connected to the output terminals of the motor drive, and the controller generates the switching signals to rapidly switch the switching devices in the inverter on and off at a predetermined switching frequency and, thereby, to alternately connect or disconnect the DC bus to the output terminals and, in turn, to the motor. The output waveform is, by nature of the switching, rectangular, either connecting or disconnecting the output of the motor drive to the DC bus, such that the output is either at the DC voltage present on the DC bus or at zero volts. By varying the duration during each switching period for which the output terminal of the motor drive is connected to the DC voltage, the magnitude of the output voltage is varied. The motor controller utilizes modulation techniques such as pulse width modulation (PWM) to vary the magnitude of the output voltage over each cycle of a desired fundamental frequency to synthesize waveforms having desired amplitudes and frequencies.

Typically, a current regulator executing on the motor drive generates a reference signal for the modulation routine. The current regulator receives feedback signals from one or more current sensors, corresponding to the current output from the motor drive to a motor controlled by the motor drive. The current feedback signals may be single phase or multi-phase but correspond to the actual current provided on the corresponding phase to the motor. The current feedback signals are converted to a stationary or synchronous reference frame in which current control loops, including a proportional regulator, an integral regulator, a differential regulator, or combinations thereof, output voltage references in the corresponding stationary or synchronous reference frames. These voltage references are converted back to voltage reference values corresponding to a desired voltage on each phase of the motor. The modulation routine, in turn, generates the switching signals to control the power electronic switching devices in the inverter section to output the desired voltage waveforms to the motor.

Historically, it was known to execute both the current regulator and the modulation routines at the same periodic update rate. This periodic update rate is also referred to as a switching frequency or switching period. However, processing of the current feedback signals requires a finite amount of time. The analog signal is first passed through an analog to digital converter to obtain a digital value of the signal and then transmitted to the processor. The processor must sample the digital value and store the sampled value in memory for use by the current regulator. The current regulator executes based on the current reference signal and the stored current feedback signal to determine a desired voltage reference. Each of these steps requires time to execute and must be performed sequentially within the switching period. Within the same interval and potentially in parallel to sampling the current and executing the current regulator, the modulation routine is determining modulation indexes for the power switching devices to generate the desired output voltages.

Because of the delay involved in sampling and processing the current feedback signals and in executing the current regulator, the modulation routine may already be switching the output voltage to a desired output voltage within the switching period before execution of the current regulator has completed. As a result, the output of the current regulator has commonly been stored for use by the modulation routine during the next switching period. This introduces a one cycle delay between determining a desired voltage reference and using the voltage reference by the modulation routine. Although the switching frequency is typically one or more orders of magnitude larger than a fundamental frequency of the output voltage and, as a result, the one cycle delay does not significantly impact the fundamental component of the output voltage, the one cycle delay can introduce some undesirable effects on the output of the motor drive. When there are rapid and/or significant changes in the current reference, the current regulator may generate some overshoot in the response to such changes. The overshoot can cause a torque ripple or a corresponding overshoot on the output current supplied to the motor. In certain applications, such as during torque control of the motor, this overshoot and/or torque ripple may either require detuning the response of the motor drive to prevent the overshoot and/or torque ripple or accepting the overshoot and/or torque ripple, either of which results in reduced performance of the motor.

Thus, it would be desirable to provide an improved method for executing the current regulator and the modulation routine within an inverter.

Historically, there have been two different approaches to solving the problem of using a voltage reference in a modulation routine one cycle after it has been determined. A first approach has been to increase the switching frequency of the motor drive. The increased switching frequency reduces the delay between determining the voltage reference and utilizing the voltage reference in the modulation routine. As a result, the overshoot and/or torque ripple may be reduced. However, an increased switching frequency increases the power losses in the inverter due to switching, reduces the time period during which the output current may be sampled, and increases the complexity of the control routine in the inverter. A second approach at solving the delay between determining the voltage reference and using the voltage reference in the modulation routine is to execute these routines consecutively within the same switching period. The second approach has its own drawbacks. Typically, an expensive analog-to-digital converter and/or processor are required, such that the hardware may be configured to perform both the analog-to-digital conversion and current regulator processing at high rates of execution. Optionally, the second approach may impose a limit on the maximum modulation index or restrict the switching frequency to provide a minimum amount of time during the start of each switching period during which the analog-to-digital conversion and subsequent processing may occur.

Thus, it would be desirable to provide a system and method for reducing or eliminating the delay by a modulation routine in using a voltage reference generated by a current regulator without incurring any of the drawbacks indicated above.

BRIEF DESCRIPTION

According to one embodiment of the invention, a method for generating a multi-phase output voltage includes measuring a value of a current output from a power converter to a load within a first switching period and determining a value of a multi-phase reference voltage as a function of the value of the current measured within the first switching period. An output voltage is generated for a first portion of phases of the multi-phase output voltage as a function of the multi-phase reference voltage determined in a switching period prior to the first switching period. An offset value is determined for a second portion of phases as a function of the multi-phase reference voltage and of the output voltage for the first portion of phases. An output voltage is generated for a second portion of phases of the multi-phase output voltage as a function of the multi-phase reference voltage and of the offset value determined a switching period prior to in the first switching period.

According to another embodiment of the invention, a method for generating a three-phase output voltage from a power converter is disclosed, where the power converter executes a plurality of instructions at a periodic interval. During a first switching period, a first current feedback value is measured for at least one phase output from the power converter and a first voltage reference is determined for each phase of the three-phase output voltage as a function of the first current feedback value. During a second switching period a second current feedback value is measured for at least one phase output from the power converter, and a second voltage reference is determined for each phase of the three-phase output voltage as a function of the second current feedback value. Switching signals are generated for a first phase of the three-phase output voltage as a function of the first voltage reference for the corresponding phase. An offset value is determined for a second phase and a third phase of the three-phase output voltage, and switching signals are generated for the second phase and the third phase as a function of the second voltage reference for the corresponding phase and of the offset value.

According to still another embodiment of the invention, a motor drive is configured to control operation of a multi-phase motor connected to the motor drive. The motor drive includes at least one current sensor configured to generate a current feedback signal corresponding to a value of current output from the motor drive and a controller configured to execute at a periodic switching frequency. The controller is configured to receive the current feedback signal and determine a reference voltage for each phase output to the multi-phase motor as a function of the current feedback signal. During a first switching period, the controller is configured to generate switching signals for a first portion of the phases for the multi-phase motor as a function of the reference voltage determined during a switching period prior to the first switching period. During the first switching period, the controller is further configured to determine an offset value for a second portion of phases for the multi-phase motor and generate switching signals for a second portion of the phases for the multi-phase motor as a function of the reference voltage and of the offset value determined during the first switching period.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
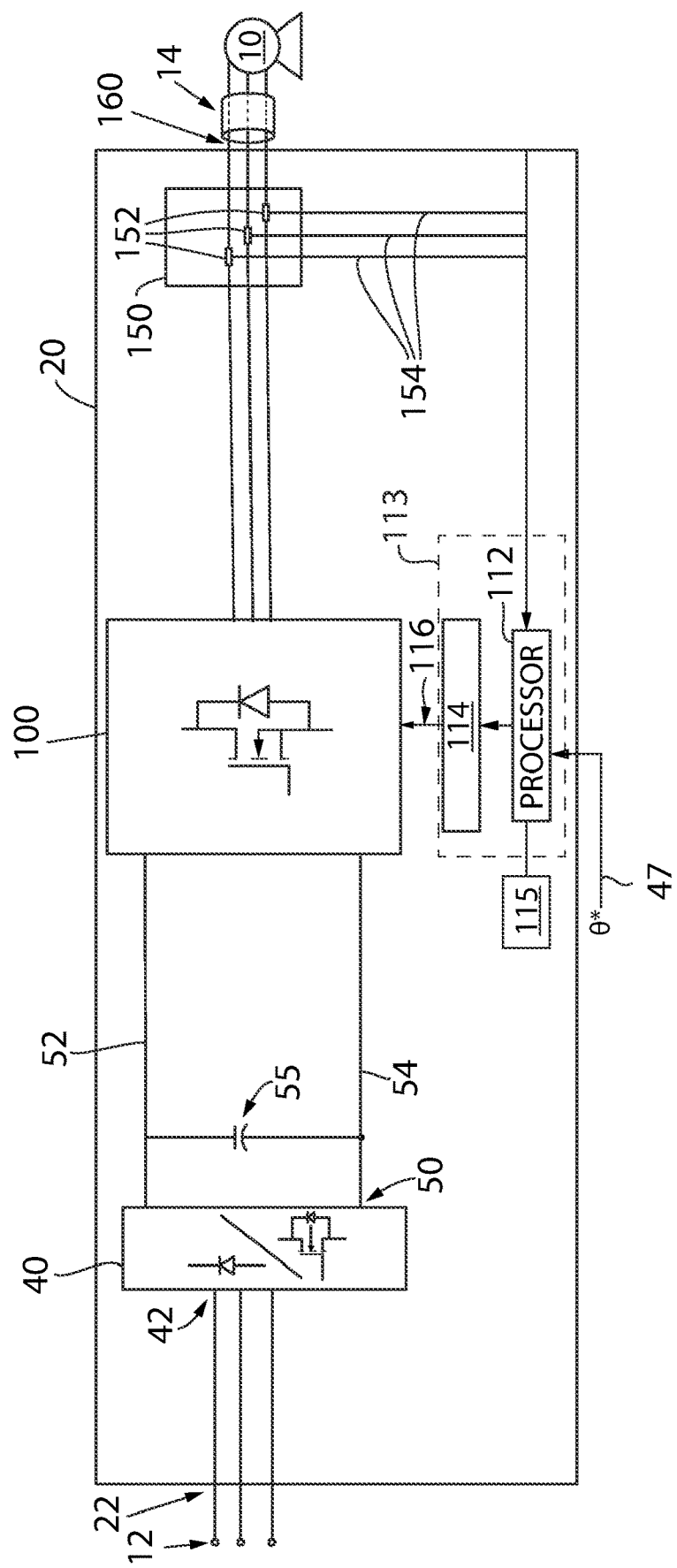
FIG. 1 is a block diagram of a motor drive incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved method for executing the current regulator and the modulation routine within an inverter which reduces or eliminates the delay by the modulation routine in using a voltage reference generated from the current regulator. Within each switching period, an output current is sampled, and the current feedback signal is provided to the current regulator. The current regulator executes to determine a desired output voltage for the motor, and the voltage references are passed to the modulation routine within the same switching period in which they are calculated. However, rather than requiring expensive transducers with rapid conversion rates, standard transducers for converting the analog value of the measured current to a digital value are provided. Additionally, the disclosed method does not require an increased switching frequency, does not limit the maximum modulation index, and does not restrict the switching frequency to provide a minimum amount of time during which the analog-to-digital conversion and subsequent processing may occur.

After the voltage references are passed to the modulation routine, the new voltage references determined by the current regulator are used by the modulation routine within the current switching period in which they are determined. According to one embodiment of the invention, the voltage references are used to determine a modulation index for each phase of the output voltage. Because there are no restrictions imposed by the modulation routine on switching frequency, analog-to-digital conversion rate, maximum modulation index and the like, the potential exists that a switching signal for one or more phases must be generated before the analog-to-digital conversion and current regulation is complete. The modulation routine stores the value of the modulation index generated from the prior switching period and uses the stored value when a new value is not yet ready. However, the modulation indexes for at least two out of three phases are typically determined prior to the switching signal needing to be generated. While the first phase may require using a modulation index from the prior switching period, the modulation indexes for the additional two phases are then utilized within the switching period in which they are calculated. An offset may be provided to the modulation indexes for each of the two additional phases to maintain a commanded differential voltage between phases during that switching period.

Traditional voltage reference generation is configured to provide a balanced three-phase voltage to the motor. When a modulation index determined from a prior switching period is used together with a modulation index from a current switching period, the resulting multi-phase voltage supplied to the motor may no longer be balanced. In order to maintain a balanced three-phase voltage, an offset value is determined and used to compensate the phase voltages using the modulation index determined within the current switching period. An exemplary application may be a motor drive supplying power to a three-phase motor. Based on the voltage reference determined in a prior switching period, the modulation routine determines that a first phase, Va, requires switching before the modulation indexes for the current switching period have been determined. After the modulation index for the current switching period is determined, the motor drive determines a difference between the actual phase output (using the voltage reference from the prior switching period) and the desired reference voltage for the current switching period. This difference is used to determine an offset value for correcting the other two phase voltages. The offset value is added to the desired reference voltage for the other two phase voltages before the modulation routine begins switching either of these two phase voltages. As a result, the differential voltages between each phase is equal to the new reference value calculated during the present switching period even though at least one phase is switched based on the reference value determined from a prior switching period.

Turning initially to FIG. 1, a motor drive 20 for determining the modulation indexes according to one embodiment of the present invention is illustrated. An AC voltage 12 is provided at an input 22 to the motor drive 20. According to the illustrated embodiment, the AC voltage 12 is a three-phase AC input voltage. The motor drive supplies an AC output voltage from an output 160 of the motor drive to a motor 10 operatively connected to the motor drive 20 via a cable 14. The output voltage is a three-phase AC output voltage with individual conductors shown extending between the motor 10 and drive 20 for each phase of the motor. It is understood that the illustrated conductors may be combined within a cable 14, run as individual conductors, or a combination thereof according to the application requirements.

Figure 2:
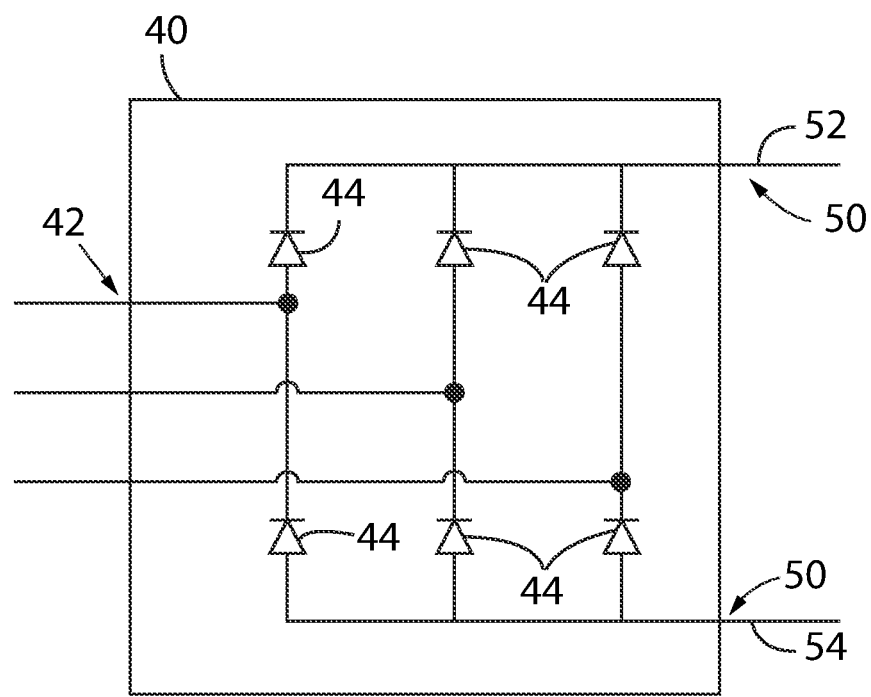
FIG. 2 is a block diagram representation of a rectifier section from the motor drive of FIG. 1.

The AC input voltage 12 is provided to a converter section 40 of the motor drive 20. One or more additional filters may be included between the input 22 of the motor drive and the converter section 40 according to the application requirements. The converter section 40 may include any electronic device suitable for passive or active rectification as is understood in the art. With reference also to FIG. 2, the illustrated converter section 40 is a passive converter and includes a set of diodes 44 forming a diode bridge. The converter section 40 receives the AC voltage 12 at an input 42, rectifies the three-phase AC voltage to a DC voltage, and provides the DC voltage to a DC bus 50 at an output of the converter section. Optionally, the converter section may be an active converter, which includes gate-controlled switching devices including, but not limited to, thyristors, silicon-controlled rectifiers (SCRs), or silicon based transistors, such as insulated gate bipolar transistors (IGBTs) or metal oxide semiconductor field-effect transistors (MOSFETs). The converter section may alternately include high frequency switching devices including, but not limited to, Silicon Carbide (SiC) or Gallium Nitride (GaN) wide band gap IGBTs or MOSFETs which may switch in the twenty kilohertz (20 kHz) to the megahertz range to convert the voltage at the input 42 from AC to a DC voltage for the DC bus 50. The DC bus 50 is connected to the output of the converter section 40, and the DC voltage output by the converter is present between the positive rail 52 and the negative rail 54 of the DC bus 50.

Referring again to FIG. 1, a DC bus capacitor 55 is connected between the positive and negative rails, 52 and 54, to reduce the magnitude of the ripple voltage resulting from converting the AC voltage to a DC voltage. It is understood that the DC bus capacitor 55 may be a single capacitor or multiple capacitors connected in parallel, in series, or a combination thereof. The magnitude of the DC voltage between the negative and positive rails, 54 and 52, is generally equal to the magnitude of the peak of the AC input voltage. The DC bus 50 is connected in series between the converter section 40 and an inverter section 100. One or more additional filters may be included between the converter section 40 and the inverter section 100 according to the application requirements.

Figure 3:
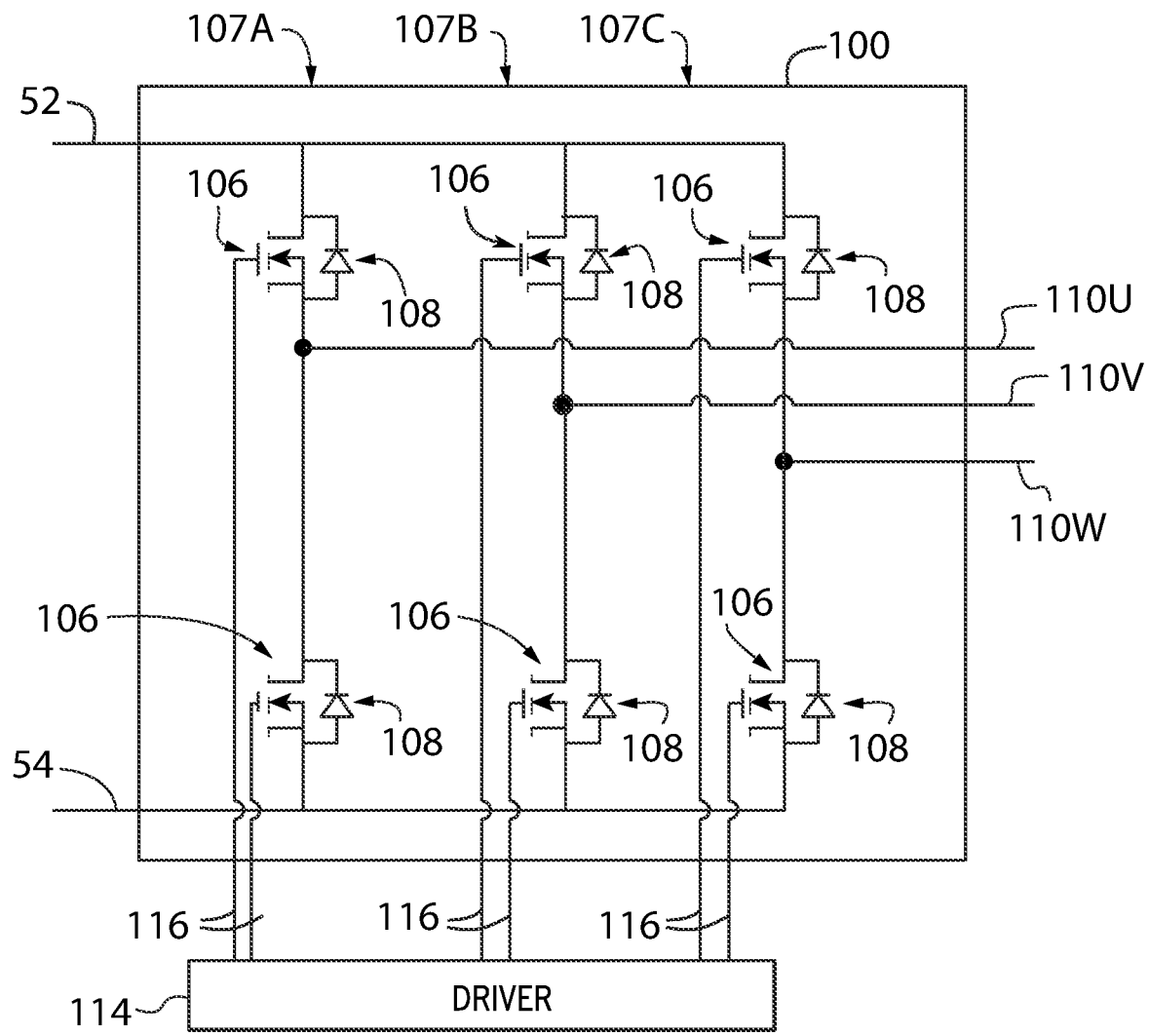
FIG. 3 is a block diagram representation of an inverter section and gate driver module from the motor drive of FIG. 1.

The inverter section 100 consists of gate-controlled switching elements as described for the active converter 40, such as silicon and/or wide band gap materials for IGBTs or MOSFETs, or Silicon Gate Controlled Thyristors (SCGT) and Gate Turn-Off thyristors (GTO) for medium voltage, high power units gap transistors as is known in the art. With reference also to FIG. 3, the illustrated inverter section 100 includes a power metal-oxide-semiconductor field-effect transistor (MOSFET) 106 and a reverse connected device 108, which may be a free-wheeling diode or a MOSFET's inherent body diode, connected in pairs between the positive rail 52 and each phase of the output voltage (110U, 110V, 110 W) as well as between the negative rail 54 and each phase of the output voltage. Each of the transistors 106 receives switching signals 116 to selectively enable the transistors 106 and to convert the DC voltage from the DC bus into a controlled three phase output voltage to the motor 10. When enabled, each transistor 106 connects the respective rail 102, 104 of the DC bus to one output phase 110, which is, in turn, connected between the inverter section 100 and the output terminal 160. One or more additional filters may be included between the output of the inverter section 100 and the output terminals 160 of the motor drive 20 according to the application requirements.

A current sense module 150 is provided at the output of the motor drive. The current sense module 150 includes a current sensor 152 on each phase of the AC output voltage. Each current sensor 152 generates a current feedback signal 154 corresponding to the current present at the output 160 of the motor drive for each phase of the AC output.

In operation, the motor drive 20 is configured to control operation of the motor 10 connected at the output 160. According to the embodiment illustrated in FIG. 1, a processor 112 and a driver circuit 114 may include and manage execution of modules used to control operation of the motor drive 20. The driver circuit 114 may be a dedicated modulation circuit, a separate core executing on the processor 112, or a module executing on the processor 112. For convenience, the driver circuit 114 and the processor 112 may be referred to herein as a controller 113 for the motor drive 20. The illustrated embodiment is not intended to be limiting and it is understood that various features of each module may be executed by another module and/or various combinations of other modules may be included in the processor 112 or driver circuit 114 without deviating from the scope of the invention. The modules may be stored programs executed on one or more processors, logic circuits, or a combination thereof. The processor 112 may be implemented, for example, in a microprocessor, application specific integrated circuit (ASIC), field programmable gate array (FPGA), or other such customizable device. The motor drive 20 also includes a memory device 115 in communication with the processor 112. The memory device 115 may include transitory memory, non-transitory memory or a combination thereof. The memory device 115 may be configured to store data and programs, which include a series of instructions executable by the processor 112. It is contemplated that the memory device 115 may be a single device, multiple devices, or incorporated, for example, as a portion of another device such as an application specific integrated circuit (ASIC). The processor 112 is in communication with the memory 115 to read the instructions and data as required to control operation of the motor drive 20.

According to one embodiment of the invention, the processor 112 receives a reference signal identifying desired operation of the motor 10 connected to the motor drive 20. The reference signal may be, for example, a torque reference (T*), a speed reference ($\omega$*), or a position reference ($\theta$*). The processor 112 also receives feedback signals indicating the current operation of the motor drive 20. The motor drive 20 may include a voltage sensor and/or a current sensor operatively connected to the DC bus 50 and generating a feedback signal corresponding to the magnitude of voltage and/or current present on the DC bus. The motor drive 20 may also include one or more current sensors 152 and one or more voltage sensors on each phase of the AC output voltage generating feedback signals 154 corresponding to the magnitude of output current and/or voltage present at the output 160 of the motor drive 20.

Figure 4:
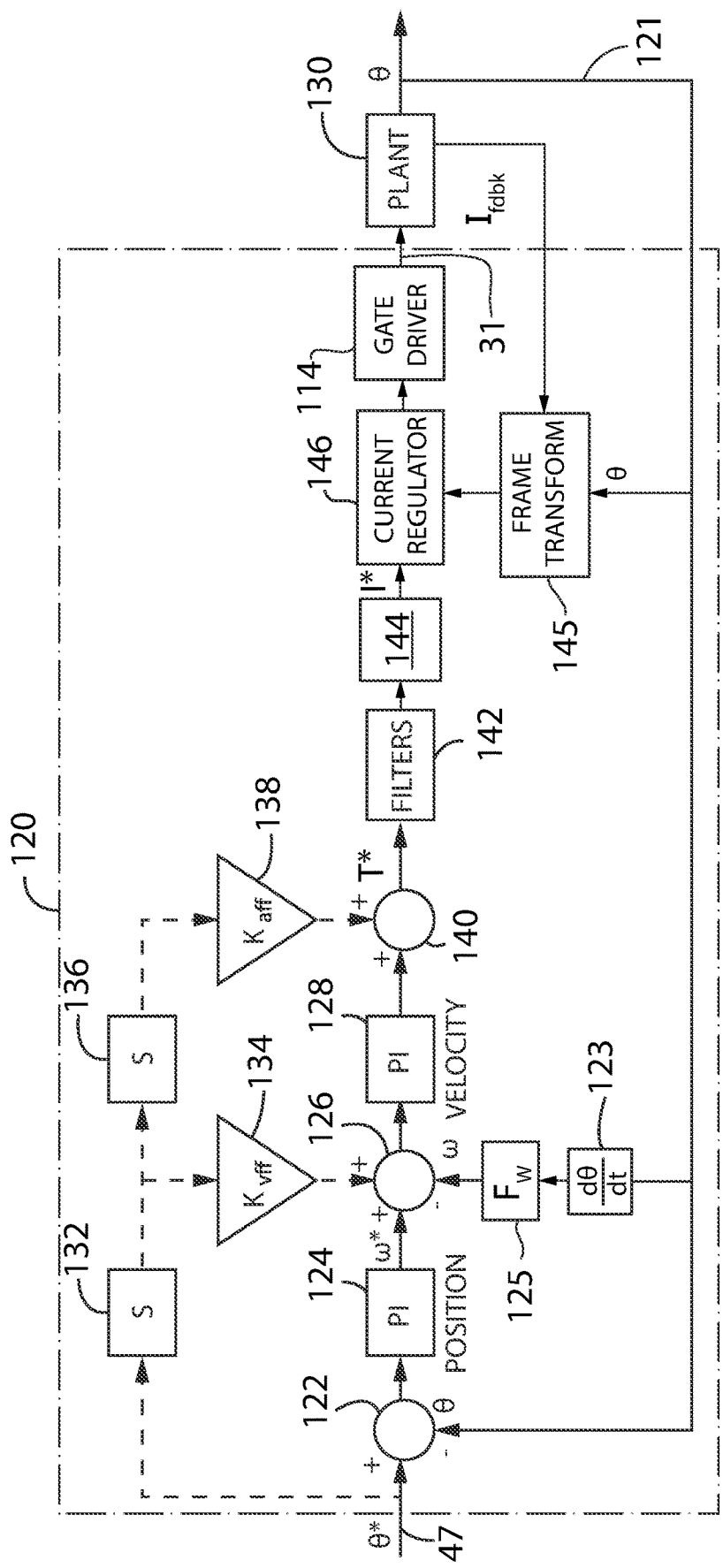
FIG. 4 is a block diagram representation of one embodiment of a controller from the motor drive of FIG. 1.

The processor 112 utilizes the feedback signals and the reference signal to control operation of the inverter section 100 to generate an output voltage having a desired magnitude and frequency for the motor 10. With reference also to FIG. 4, an exemplary controller 120 for the motor drive 20 is illustrated. The controller 120 may implemented as a series of instructions stored in the memory 115 of the motor drive 20 and executed on the processor 112. The illustrated controller 120 receives a position reference signal ($\theta$*) 47 as an input to a series of cascaded control loops. The controller 120 includes a position control loop, a velocity control loop and a current control loop. The control loops are shown as cascading control loops where an output of one control loop is provided as an input to another control loop. It is contemplated that various other control topologies may be utilized within the motor drive 20.

In the position control loop, the position reference signal ($\theta$*) 47 is compared to a position feedback signal ($\theta$) 121 at a first summing junction 122. A position error signal is output from the first summing junction 122 and input to a position loop controller 124. According to the illustrated embodiment, the position loop controller 124 is a proportional-integral (PI) controller. Optionally, the position loop controller 124 may be just a proportional (P) controller or further include a derivative (D) component. Each of the proportional (P), integral (I), and/or derivative (D) components of the position loop controller 124 includes a controller gain. The position loop controller gains are commonly referred to as a position loop proportional gain (Kpp), position loop integral gain (Kpi), and a position loop derivative gain (Kpd). The output of the position loop controller 124 is a velocity reference signal (ω*).

In the velocity control loop, the velocity reference signal (ω*) is compared to a velocity feedback signal (ω) at a second summing junction 126. The velocity feedback signal (ω) is generated by taking a derivative, as shown in the derivative block 123, of the position feedback signal (θ). The velocity feedback signal (ω) may also be filtered by a velocity filter block 125. A velocity error signal is output from the second summing junction 126 and input to a velocity loop controller 128. According to the illustrated embodiment, the velocity loop controller 128 is a proportional-integral (PI) controller. Optionally, the velocity loop controller 128 may be just a proportional (P) controller or further include a derivative (D) component. Each of the proportional (P), integral (I), and/or derivative (D) components of the velocity loop controller 128 includes a controller gain. The velocity loop controller gains are commonly referred to as a velocity loop proportional gain (Kvp), velocity loop integral gain (Kvi), and a velocity loop derivative gain (Kvd). The output of the velocity loop controller 128 is an acceleration reference signal.

The controller 120 may also include feed forward branches. According to the illustrated embodiment, the controller 120 includes feed forward branches for both the velocity and the acceleration elements. The position reference signal (θ*) 47 is passed through a first derivative element 132 to obtain a velocity feed forward signal. The velocity feed forward signal is multiplied by a velocity feed forward gain (Kvff) 134 and combined with the velocity reference signal (ω*) and the velocity feedback signal (ω) at the second summing junction 126. The velocity feed forward signal is passed through a second derivative element 136 to obtain an acceleration feed forward signal. The acceleration feed forward signal is multiplied by an acceleration feed forward gain (Kaff) 138 and combined with the acceleration reference signal at a third summing junction 140 to generate a torque reference signal (T*). As is known in the art, the torque required by a motor to achieve a desired acceleration is related according to the inertia of the motor. A gain block including the inertia of the motor may be included between the outputs of both the velocity loop controller 128 and the output of the acceleration feed forward gain and the third summing junction 140 to convert the acceleration signals to torque signals. Optionally, the inertia of the motor may be incorporated into the gains of the velocity loop controller 128 and the acceleration feed forward gain such that the output of the velocity loop controller 128 and the acceleration feed forward block are both torque signals. According to still another option, the third summing junction 140 may combine acceleration signals and an inertial gain block may be included after the third summing junction 140 to generate the torque reference signal (T*).

The torque reference signal (T*) output from the third summing junction 140 is further processed prior to generating gate signals 116 for the inverter section 100. The torque reference signal (T*) is provided as an input to a filter section 142, which may include one or more filters to remove unwanted components from the control system, such as a low pass filter to attenuate undesirable high frequency components or a notch filter to attenuate specific frequency components having an undesirable effect on the controlled mechanical load. The output of the filter section 142 is passed through a torque gain block 144. The torque gain block 144 may include a torque constant (Kt) which defines a relationship between the current provided to the motor 10 and the torque output by the motor. The torque gain block 144 may include one or more additional gain elements, such as inertia-related gains, combined with the torque constant (Kt) to produce a desired current reference (I*) to a current regulator 146. The current regulator 146 receives a current feedback signal (Ifdbk) from the current sensors 152 at the output of the motor drive 20 and utilizes a current controller, which may include proportional, integral, and/or derivative components to regulate the current in the motor 10.

The current feedback signal (Ifdbk) is received at the controller 120 as signals corresponding to individual phases of the motor. The current feedback signal (Ifdbk), as illustrated, includes multiple feedback signals, where each signal corresponds to an amplitude of current as measured on one phase of the multi-phase motor 10. For a three-phase motor, it is contemplated that the amplitude of current is measured in all three phases of the motor. Optionally, the amplitude of current is measured in two phases of the motor and the amplitude of the third phase is determined as a function of the amplitude of the two measured phases. The measured feedback signals are then provided to a reference frame transformer 145 within the controller 120 for use by the current regulator 146.

The reference frame transformer 145 is configured to transform the current feedback signals from the stationary, physical reference frame in which the signals are measured to a rotating reference frame. The reference frame transformer 145 receives the measured phase currents in a stationary reference frame (Ifdbk) and a position feedback signal (θ) as inputs. The position feedback signal (θ) corresponds to an angular position of the motor 10. The position feedback signal (θ) may be a mechanical angular position of the motor or an electrical angular position corresponding to the electrical angle of the current provided to the motor 10. The transform between reference frames, however, utilizes electrical angular position of the current to convert the current feedback signal from the stationary reference frame to a rotating reference frame. Therefore, if the position feedback signal (θ) is the mechanical angular position of the motor, the reference frame transformer 145 first converts the mechanical angular position of the motor to the electrical angle of the current as a function of the number of poles in the motor. In the stationary reference frame, the current applied to the motor 10 varies sinusoidally at a commanded frequency output by the motor controller 20. If the current feedback signals are converted to a reference frame that rotates at an identical frequency to the commanded frequency, the rotating reference frame is synchronous to the output current and the current feedback signal becomes a "DC", or constant, value.

The reference frame transformer 145 is used to convert the measured current feedback signals to a synchronous reference frame rotating at the fundamental frequency of the current output to the motor 10. As shown below in Eqs. 1 and 2, the frame transformation utilizes the electrical angle of the motor and the amplitude of the currents measured in the motor to generate a synchronous current feedback signal rotating at the fundamental frequency of the motor. Equation 1 defines the current in the "d" axis, and equation 2 defines the current in the "q" axis. Both currents are present when the feedback current is referred to in the d-q axes. The synchronous current feedback signal output from the reference frame transformer 145 is in the synchronous reference frame, also referred to as a d-q reference frame, and includes both the d axis and the q axis components of current. The synchronous current feedback signal is provided as an input to the current regulator 146 in order to generate a voltage reference signal, where the voltage reference signal, when applied to the motor 10, generates the desired current reference, I*, input to the current regulator 146.

$$i_{d\_fund} = \frac{2}{3}[i_a\cos\theta + i_b\cos(\theta - 120°) + i_c\cos(\theta - 240°)] \quad (1)$$

$$i_{q\_fund} = -\frac{2}{3}[i_a\sin\theta + i_b\sin(\theta - 120°) + i_c\sin(\theta - 240°)] \quad (2)$$

where:
θ=electrical angle;
$i_a$=amplitude of current in phase "a" of the motor;
$i_b$=amplitude of current in phase "b" of the motor; and
$i_b$=amplitude of current in phase "c" of the motor.

The output of the current regulator 146 is a voltage reference in the d-q reference frame. The voltage reference may be converted to a stationary reference frame or represented as a magnitude and phase angle. The electrical angle is used to convert the voltage reference back to reference voltages for each phase voltage. The voltage reference is provided to the gate driver 114 which, in turn, generates the switching signals 116 to the inverter section 100. It is contemplated that the voltage reference may be transformed back to phase voltages prior to being provided to the gate driver 114. Optionally, the gate driver 114 may be configured to perform the inverse transform and then generate the switching signals. The output of the gate driver 114 is illustrated as being supplied to the plant 130 of the controlled system. In a motion control system, the plant 130 typically includes the inverter section 100 of the motor drive 20, the motor 10, a mechanical load, a position feedback device, and mechanical couplings between the motor and mechanical load or between the motor and a position feedback device. The position feedback device generates the position feedback signal (θ) used by the controller 120.

The gate driver module 114 converts the voltage reference output from the current regulator to a desired output voltage having a variable amplitude and frequency, where the amplitude and frequency are selected to produce the desired operation of the motor 10. The gate driver module 114 then generates the switching signals 116 used by pulse width modulation (PWM) or by other modulation techniques to control the switching elements in the inverter section 100 to produce the desired output voltage. The switching signals 116 subsequently enable/disable the transistors 106 to provide the desired output voltage to the motor 10, which, in turn, results in the desired operation of the mechanical load coupled to the motor 10.

Figure 5:
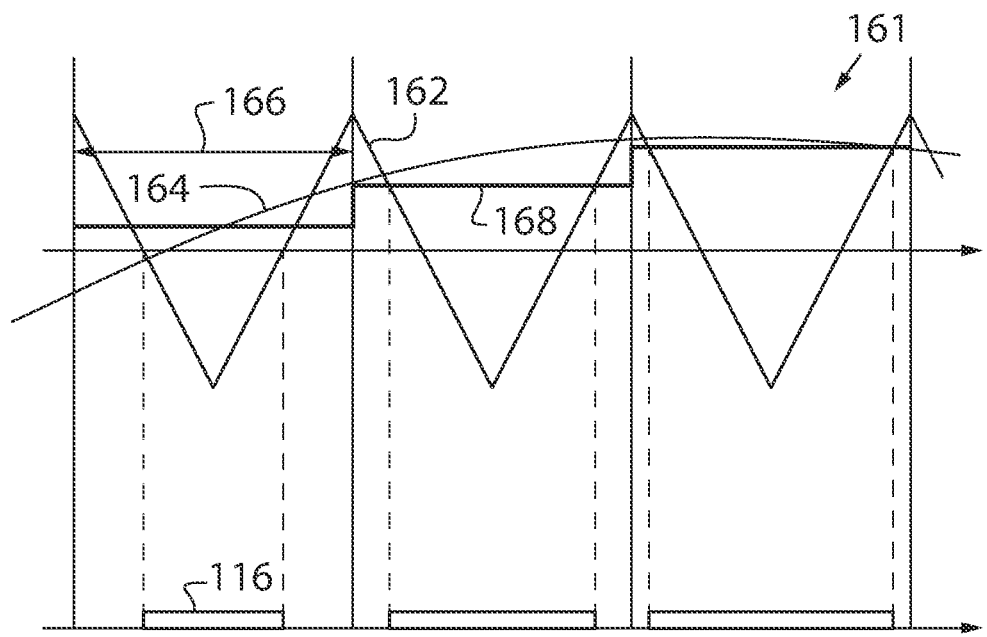
FIG. 5 is a timing diagram of an exemplary sine-triangle comparison modulation technique.

Referring next to FIG. 5, a segment of one phase of an AC voltage output according to an exemplary sine-triangle PWM modulation technique 161 is illustrated. In the sine-triangle PWM modulation technique 161, a triangular waveform 162 is compared to the voltage reference 164 to generate switching signals 116. The switching signals 116 control the switching elements 106 that selectively connect or disconnect each phase of the output terminal 110 to either the positive voltage rail 52 or the negative voltage rail 54. One period of the triangular waveform 162 is defined by the switching period 166 of the PWM routine. During the switching period 166, if the voltage reference 164 is greater than the triangular waveform 162, the switching signal 116 is set high and, if the voltage reference 164 is less than the triangular waveform 162, the switching signal 116 is set low. The resulting output voltage 168 can be represented by a stepped waveform where the magnitude of the stepped waveform during each period 166 is the average value of the output voltage 168 during that period 166. The average value is determined by multiplying the magnitude of the DC voltage present on the DC bus 50 by the percentage of the period 166 that the switching signal 116 is set high. As the switching period 166 of the PWM routine decreases, the stepped output voltage 168 more accurately corresponds to the voltage reference 164. It is contemplated that other modulation techniques, as would be known to one skilled in the art, may also be used to generate the output voltage, such as space-vector or multi-level switching. Further, the modulation techniques may be implemented by comparing analog signals; digital signals, such as a register being incremented up and down; or a combination thereof.

In practice, a direct comparison of a sinusoidal waveform to a triangular waveform in order to generate switching signals 116 is not typically performed. Rather, the processor 112 or gate driver circuit 114 uses the voltage reference signal output from the current regulator 146 to determine a modulation index required to produce a desired voltage for each phase of the motor 10. A modulation index defines a portion of a switching period for which the output voltage should be on. The modulation index is commonly defined as a value between zero and one, where zero is zero percent of the switching period 166 and one is one hundred percent of the switching period 166. For purposes of illustration, the present invention will be discussed with respect to determination of modulation indexes. This embodiment is not intended to be limiting to a particular modulation method, but rather, is an exemplary embodiment of the present invention.

According to the exemplary embodiment of the invention, the voltage references are used to generate modulation indexes for each phase, determining the amount of time within the corresponding switching period 166 that a switching signal 116 for the respective phase will be output. Within a motor drive 20 many different processes are scheduled to execute. The processes may include sampling input signals, setting values at output terminals, reading or writing to communication buffers, executing different control modules, and the like. Firmware within the motor drive 20 schedules execution of each process according to timing requirements, processing capability, communication bandwidth, and the like. The processor 112 may include multiple cores executing different processes in parallel. Similarly, dedicated processing circuits, such as the gate driver 114, may execute in parallel with the processor 112. One of the scheduled processes within the motor drive 20 typically handles current and voltage regulation supplied to the motor 10. This process executes at a frequency commonly referred to as a switching frequency. The reference values for each phase are updated once, and sometimes twice, within this periodic interval.

Figure 6:
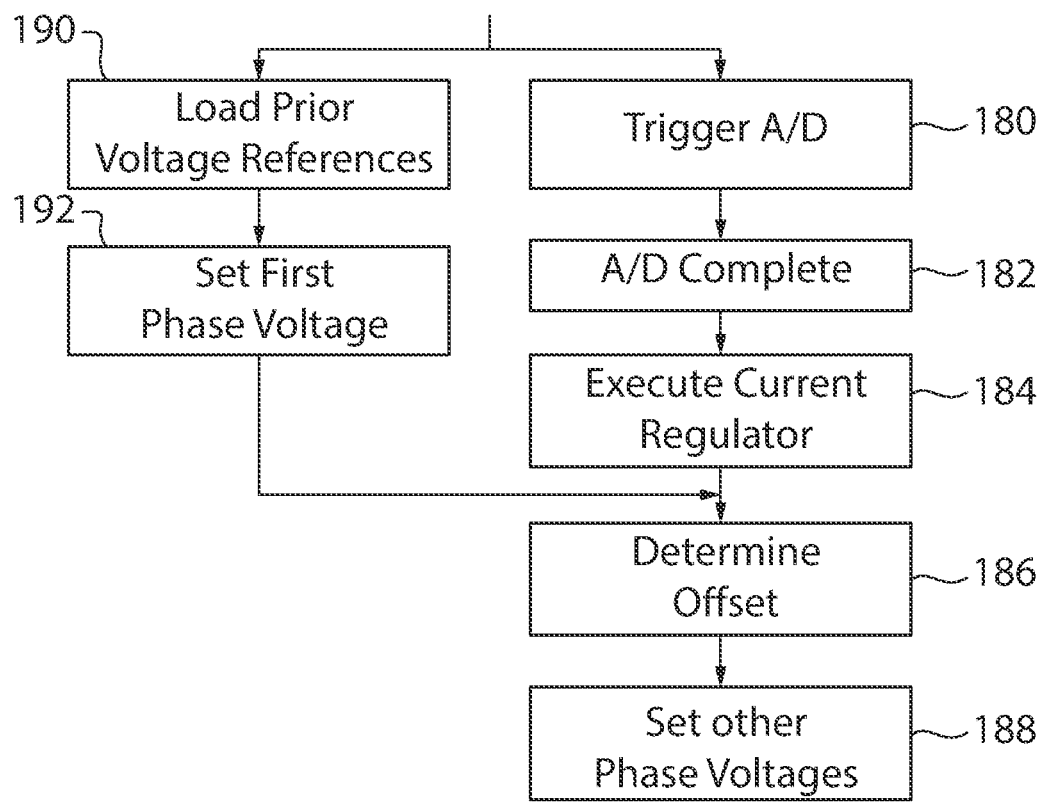
FIG. 6 is a flow diagram illustrating exemplary steps for determining output voltages according to one embodiment of the invention.

Turning next to FIG. 6, the steps performed to determine modulation indexes are illustrated. At the start of the illustrated flow diagram, an interrupt or other trigger initiates parallel operation of two tasks. A first task 190 provides the voltage reference values determined in the prior switching period to the modulation routine. Optionally, the voltage reference values may be provided as an initial step performed at the start of the switching period and in series with triggering the analog-to-digital conversion. As illustrated, however, the analog-to-digital conversion executes at step 180 in parallel with loading references to the modulation routine and initiates analog-to-digital conversion of the current feedback 154 signals from the current sensors 152.

Upon completion of the analog-to-digital conversion, as shown in step 182, the processor 112 executes the current regulator 146, as further indicated in step 184. The current regulator 146 determines new voltage reference values for the present switching period to obtain desired output voltages for the motor 10. According to the embodiment illustrated in FIG. 1, the motor 10 is a three-phase motor and voltages for each phase will be determined.

Under certain operating conditions, it is contemplated that the analog-to-digital conversion and execution of the current regulator may complete in its entirety before one phase requires switching. Under these first set of operating conditions, the voltage reference values determined in the present switching period are then provided to the modulation routine to update the voltage reference values which were previously provided to the modulation routine at step 190. Under other operating conditions, it is contemplated that one phase of the output voltage must begin switching prior to completion of the current regulator. Under these second set of operating conditions, as shown in FIG. 6, the modulation routine uses the voltage reference value from the prior switching period which was provided to the modulation routine at step 190 to begin generating switching signals before the new reference voltage for the present switching period has been determined as shown in step 192. The new reference voltage is, however, determined before the second or third phases require switching. As shown in FIG. 6, the processor 112 determines an offset value at step 186. The offset value is used to compensate the voltage reference values for the second and third phase voltages. These compensated reference voltages are used by the modulation routine to generate the output voltages for the second and third phases.

When one of the phases must start switching before a new voltage reference has been determined, it is desirable to maintain the desired line-to-line voltages for the motor within the switching period. Line-to-line voltages are determined as shown in equations 3-5 below.

$$V_{ab}=V_a-V_b \qquad (3)$$

$$V_{bc}=V_b-V_c \qquad (4)$$

$$V_{ca}=V_c-V_a \qquad (5)$$

where:
$V_a$=voltage present in phase A of the motor;
$V_b$=voltage present in phase B of the motor; and
$V_c$=voltage present in phase C of the motor.

In an exemplary application, it will be assumed that phase A of the motor must begin switching before the new voltage reference is determined, but phases B and C for the motor don't begin switching until after the new voltage reference is determined. With reference to equations 3 and 5 above, the line-to-line voltage for $V_{ab}$ and $V_{ca}$ within that switching period would not correspond to the desired line-to-line voltage because phase $V_a$ started switching using the voltage reference value from the prior period. In order to obtain the desired line-to-line voltage, an offset value is determined, as shown in step 186 of FIG. 6. This offset value is added to phase B and to phase C of the motor. The offset value compensates for the difference in line-to-line voltage resulting from phase A using the voltage reference from the prior switching period. Further, the offset value cancels each other out when determining the line-to-line voltage for $V_{bc}$ as shown in equation 7 below. As shown in step 188, the other two phases will use the modified reference value, including the offset value, for the switching period in which the reference voltages were determined. Thus, all three line-to-line voltages become the desired line-to-line voltage for that switching period based on the sampled current values within that switching period and without incurring a full switching period delay. The modified line-to-line voltages are determined as shown below in equations 6-8.

$$V_{ab}=V_a-(V_b+V_{offset}) \qquad (6)$$

$$V_{bc}=(V_b+V_{offset})-(V_c+V_{offset}) \qquad (7)$$

$$V_{ca}=(V_c+V_{offset})-V_a \qquad (8)$$

where:
$V_a$=voltage present in phase A of the motor;
$V_b$=voltage present in phase B of the motor;
$V_c$=voltage present in phase C of the motor; and
$V_{offset}$=offset value added to phase B and to phase C of the motor.

Figure 7:
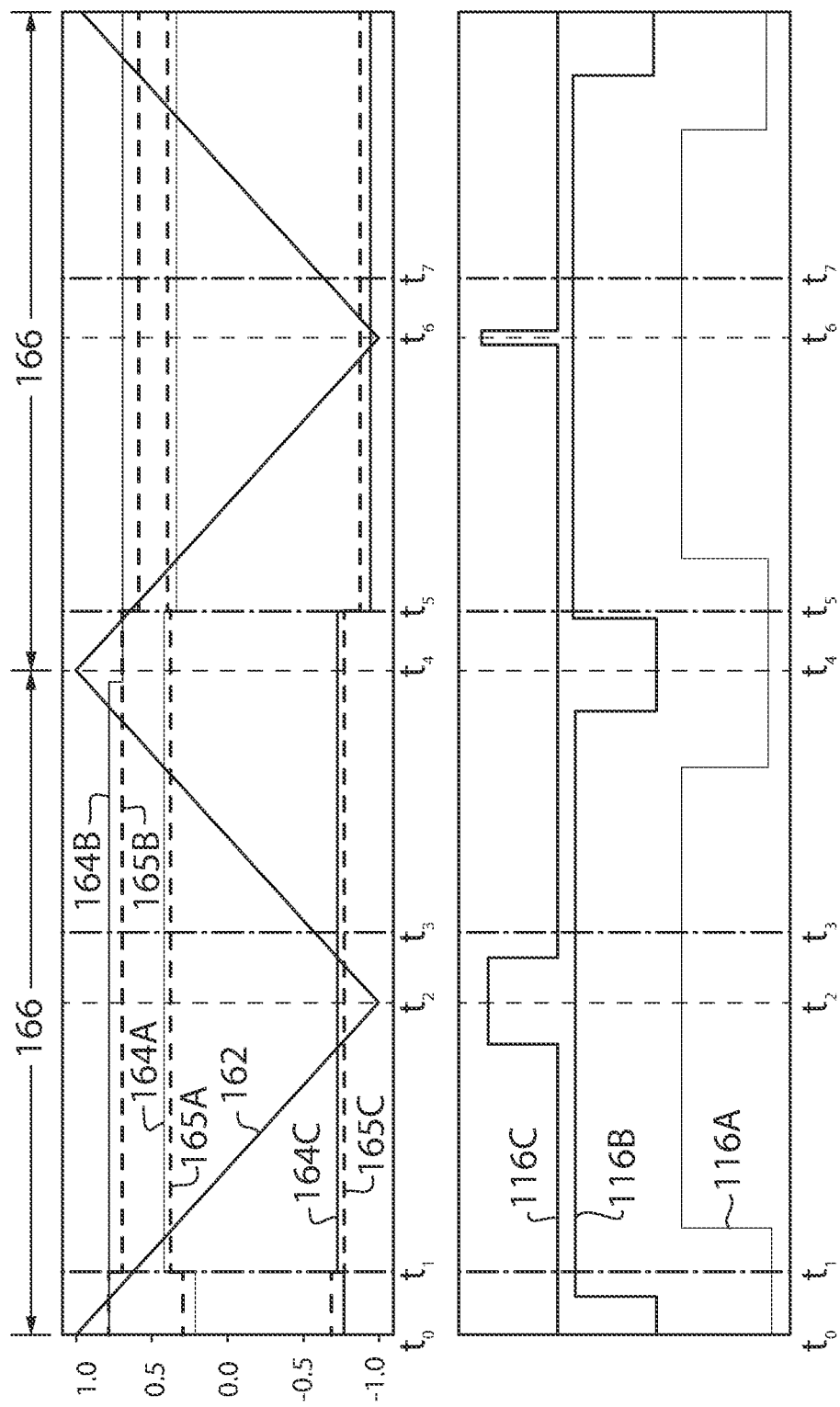
FIG. 7 is a timing diagram of an exemplary modulation routine generating switching signals for a multi-phase output voltage in a single-update mode.

With reference next to FIG. 7, a sample plot of switching signals 116 calculated within two different switching periods for a three-phase motor is illustrated. Within one switching period 166, three voltage reference values 164 for the present switching period are determined. Voltage reference values 165 for the prior switching period are also illustrated. A first voltage reference 164A corresponds to a desired voltage on the first phase, identified as phase A, of the 10. A second voltage reference 164B corresponds to a desired voltage on the second phase, identified as phase B, of the motor 10. A third voltage reference 164C corresponds to a desired voltage on the second phase, identified as phase C, of the motor 10. When the voltage reference values are determined in a per unit system, the desired voltage reference may be a value between zero and one for zero volts and rated volts. The desired voltage reference may be a value between minus one and one for a value between negative and positive rated voltage. These voltage references in a per unit value translate directly to a modulation index, or percentage of the switching period 166 for which a switching signal should be set. The modulation index corresponds to a period of time when the voltage reference 164 is greater than the carrier signal 162. A first switching signal 116A transitions from low to high when the first voltage reference 164A is greater than the carrier signal 162 and transitions from high to low when the first voltage reference 164A drops back below the carrier signal 162. A second switching signal 116B transitions from low to high when the second voltage reference 164B is greater than the carrier signal 162 and transitions from high to low when the second voltage reference 164B drops back below the carrier signal 162. A third switching signal 116C transitions from low to high when the third voltage reference 164C is greater than the carrier signal 162 and transitions from high to low when the third voltage reference 164C drops back below the carrier signal 162. The illustrated example is for a single update during each carrier period 166. The switching signal 116 for each phase is symmetric about the center of the carrier period 166, where the center of the carrier period is shown at time t2.

As seen in FIG. 7, at least one phase of a multi-phase voltage is commonly switched on early in the carrier period 166. In the illustrated carrier period 166, phase B must be switched on early in the period. According to the illustrated embodiment, it is contemplated that the duration of time between t0, which is the start of the carrier period 166, and t1 corresponds to the amount of time the motor drive 20 requires to sample the output current and execute the current regulator 146 to generate voltage references 164. However, phase B has a voltage reference value 165B from the prior switching period which requires that the switching signal 116B be generated before the current sampling and current regulator execution is complete. In this instance, the modulation routine may use the voltage reference value 165B from the prior carrier period 166.

Figure 8:
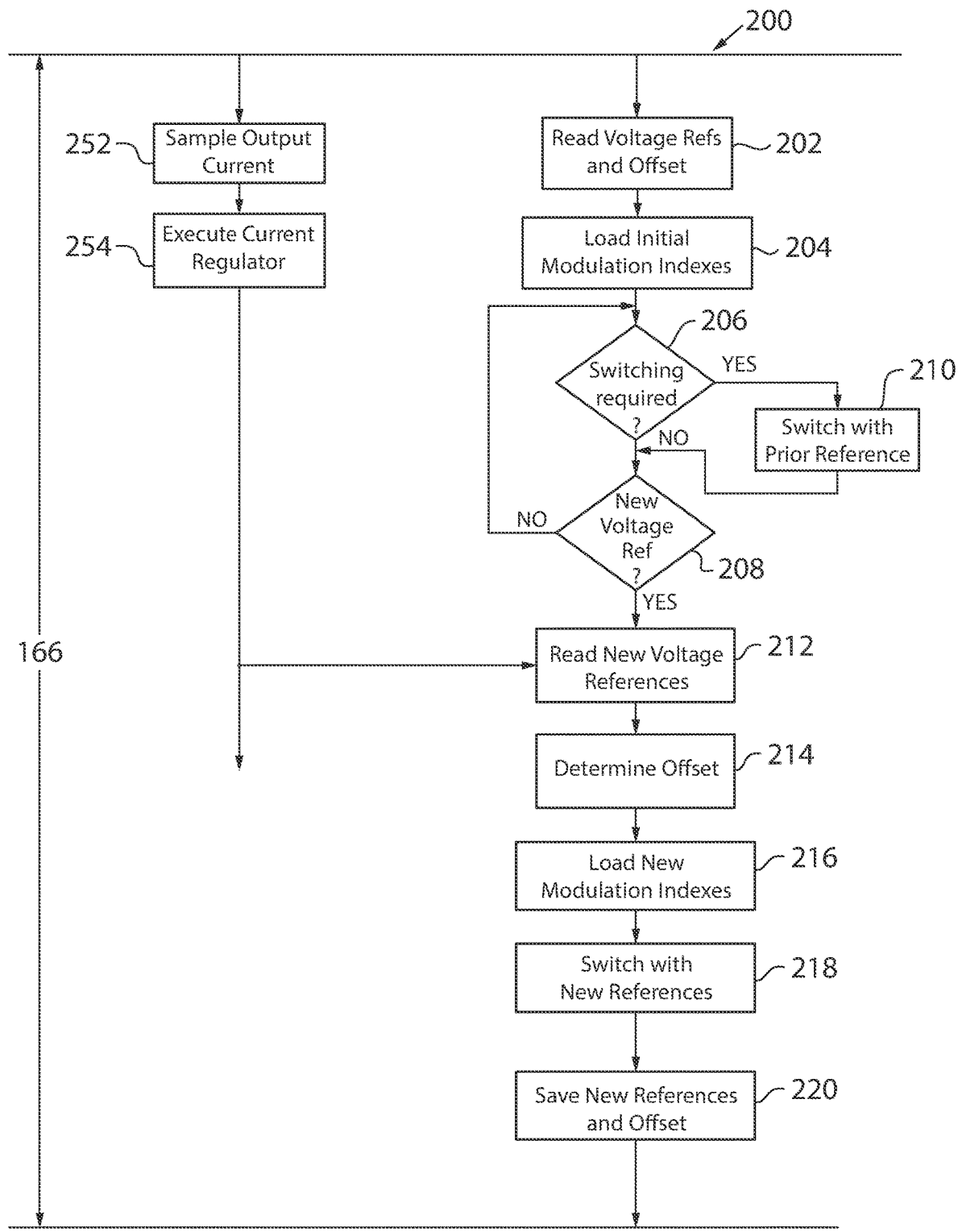
FIG. 8 is a flow diagram illustrating execution of multiple modules in parallel within a switching period according to one embodiment of the invention.

With reference also to FIG. 8, a flow diagram illustrating at least a portion of the execution performed by the motor drive 20 during a switching period 166 is illustrated. As previously discussed, multiple modules may be executing in parallel. According to the illustrated embodiment, sampling the output current, as performed by step 252, and execution of the current regulator, as shown in step 254, may be performed in parallel to a modulation routine 200. The modulation routine 200 reads the voltage references and any stored offset for each phase from the prior switching period and determines modulation index values for each phase for the current switching period 166, as shown in steps 202 and 204. In this manner, the modulation routine 200 has modulation indexes and is prepared to begin modulation as soon as any phase requires modulation within the switching period 166. At steps 206 and 208, however, the modulation routine may continually monitor if the current regulator 146 has completed execution and generated new voltage reference values. If, at step 206, switching is required for one or more of the phases, the modulation routine will begin generating switching signals 116 for that phase, as shown in step 210. If, however, the current regulator 146 completes execution and determines new voltage references prior to a phase requiring switching, the modulation routine 200 reads the new voltage reference values as shown in step 212.

At step 214, the modulation routine 200 determines any necessary offset values, $V_{offset}$. In the example illustrated in FIG. 7, phase B started switching before the current regulator 146 completed execution. As a result, the voltage reference 164B used for the present period remains unchanged. At time $t_1$, a new voltage reference 165B for the next switching period is determined, but the modulation will use the voltage reference 164B for phase B from the prior period for the duration of the present switching period 166. At time $t_1$, the current regulator 146 also determined a new voltage reference value 165A for phase A and a new voltage reference value 165C for phase C. The voltage offset, $V_{offset}$, corresponding to a difference in the value of the voltage reference 164B for phase B during the prior switching period and the value of the voltage reference 165B during the present period is determined. The voltage offset will be added to phase A and phase C to achieve the desired line-to-line voltages as shown above in equations 6-8. As a result of adding the offset value to phase A and phase C, the compensated value of the voltage reference 164A and 164C determined at time $t_1$, is greater than the calculated voltage reference value 165A and 165C for the period. These new modulation indexes are provided to the modulation routine as shown in step 216.

When each phase that was not switched based on the voltage reference from the prior switching period 166 requires switching, the modulation routine uses the new modulation indexes which were determined as a function of the sampled current, the voltage reference generated, and the offset determined within the same switching period 166. As a result, the one carrier period delay in phase voltages is eliminated for at least a portion of the phases. The one carrier period delay for line-to-line voltages is eliminated entirely by use of the offset value. If the modulation index for each phase is low enough, it is contemplated that the modulation routine may determine modulation indexes for each phase based on the current sampled and voltage reference generated within the same switching period 166. Alternately, in instances where the motor drive 20 may operate, for example, in over-modulation and each phase has a large modulation index, the modulation routine may continue operation by using the voltage reference from the prior switching period for each of the phases of the motor 10. Most commonly, it is contemplated that the motor drive 20 will need to utilize a voltage reference from the prior switching period for one or two phases, considered a first portion of the phases of the motor, and will be able to utilize the voltage reference determined during the present switching period 166 for the other one or two phases, considered a second portion of the phases of the motor.

With reference again to FIG. 7, it is contemplated that the voltage offset may be alternately added and subtracted to phases A and C. As previously indicated, modifying the modulation indexes for phases A and C allow the motor drive 20 to supply the desired line-to-line voltage to the motor 10. However, adding the offset voltage to two out of the three phases generates asymmetry in the three voltage waveforms and introduces a small zero sequence voltage at the output of the motor drive. The zero sequence voltage may introduce some undesired common mode currents within the motor drive. However, by alternately adding and subtracting the offset, the zero sequence voltage will alternate between a small positive and a small negative value. The average value of the zero sequence voltage remains approximately zero reducing the effects of adding the offset to two phases of the output voltage.

FIG. 7 illustrates the motor drive 20 executing in a single-update mode. During a single update mode, the current is sampled and the desired output voltage is determined once during each switching period 166. Optionally, the motor drive 20 may also be operated in a double-update operating mode. In the double-update operating mode, the current is sampled both at the beginning and at the middle of the switching period 166 as represented by times t0 and t2, respectively. The current regulator executes to determine a desired output voltage responsive to obtaining both samples. During operation in a double-update mode, the sampling and execution of the current regulator at the beginning of the switching period ends at time t1. The sampling and execution of the current regulator at the middle of the switching period ends at time t3. A double-update operating mode allows the modulation routine 200 to modify the end time of the switching signal 116 for each phase based on the newly calculated reference voltage. This results in switching signals 116 which are asymmetric about the middle (t2) of each switching period 166. The double-update mode improves the resolution for the modulation routine and reduces harmonic distortion in the output voltage waveforms.

Figure 9:
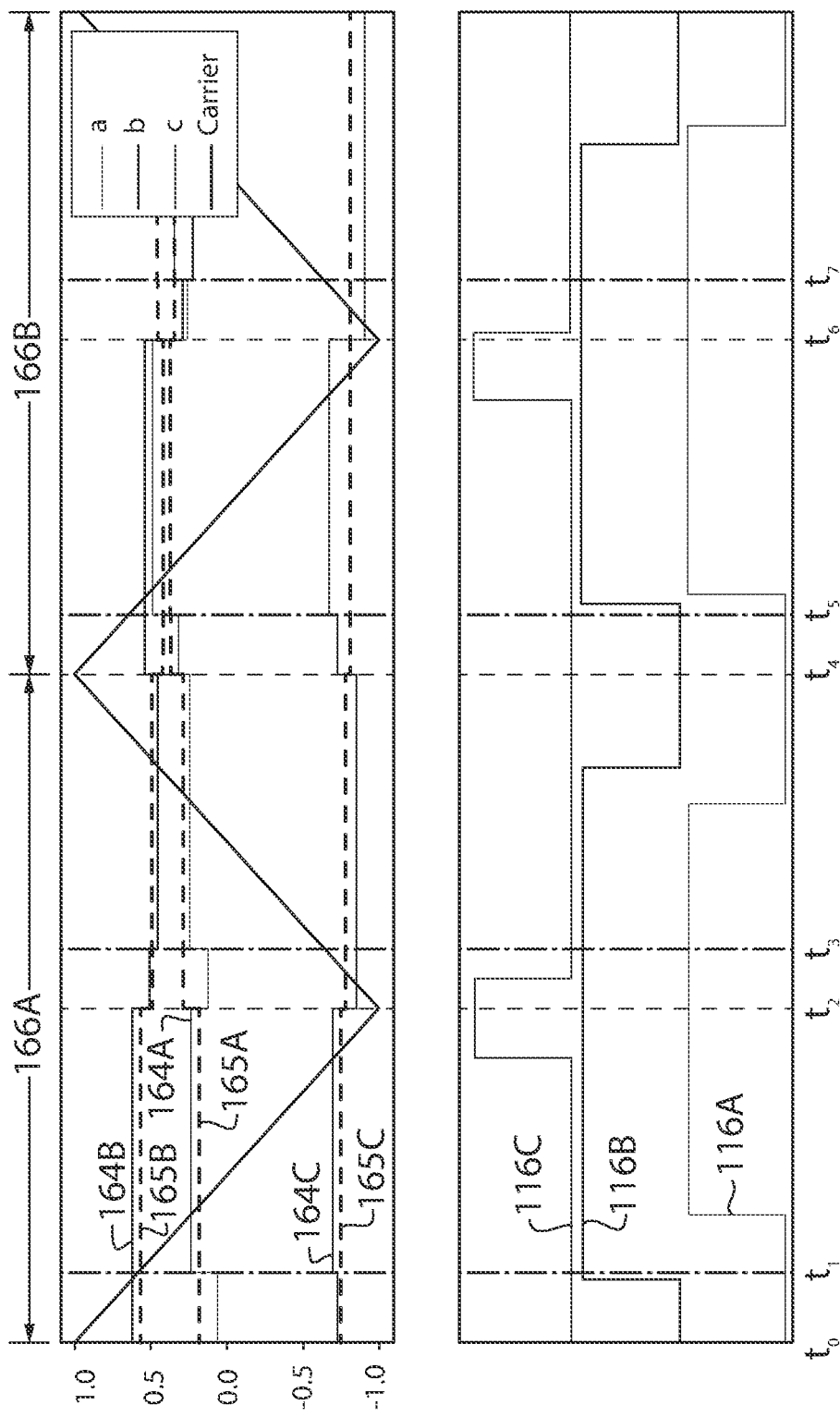
FIG. 9 is a timing diagram of an exemplary modulation routine generating switching signals for a multi-phase output voltage in a double-update mode.

Turning next to FIG. 9, operation of the motor drive 20 in the double-update mode is illustrated. At the start of the first switching period 166A, the modulation routine receives voltage reference values 164 based on the prior switching period. The voltage reference values 164 are provided to the modulation routine 200 at the start of the switching period 166A such that it may generate switching signals 116 at any point within the switching period. Current sampling and execution of the current regulator occur between the start of the period, t0, and the first time, $t_1$, indicated on the plot. Similar to the example discussed above with respect to FIG. 7, based on the voltage reference value 164 from the prior period phase B requires switching prior to the first time, $t_1$, and the switching signal 116B for phase B is generated based on the voltage reference from the prior period. After new voltage reference values are determined by the current regulator, an offset value, corresponding to the difference between the voltage reference value for the present period and the prior period is determined and added to the voltage reference value for phase A and for phase C. The new voltage reference values for phase A 164A and for phase C 164C are provided to the modulation routine at the first time, $t_1$, and used to generate the start of the switching signals 116A, 116C for the respective phases.

Because FIG. 9 illustrates a double-update operating mode, the current is again sampled at the midpoint, $t_2$, of the switching period 166 and the current regulator executes to determine a new voltage reference. The duration of this sampling and execution of the current regulator extends between the midpoint, $t_2$, and the third time, $t_3$, illustrated on the plot. The voltage references determined at the midpoint may be used to modify the modulation index for each phase within the switching period, which changes the end point, or transition from high to low for each switching signal 116, and the switching signals 116 become asymmetric about the midpoint of the switching period.

Similar to the starting point of the switching period, one of the phases may complete switching within the second half of the period before the new voltage reference values have been determined. In the illustrated example, phase C completes its switching for the present switching period 166 before an updated voltage reference has been determined. In this instance, the difference between the new voltage reference determined in the second half of the switching period and the voltage reference determined in the first half of the switching period is used to determine a new voltage offset value. The new voltage offset value is subtracted from the voltage reference values for phase A and phase B. The modified voltage reference values for phase A and phase B (164A and 164B respectively) are provided to the modulation routine at the third time, $t_3$, and used to transition the switching signals 116A, 116B from high to low during the second half of the switching period. Adding the offset to phase A and phase B maintains the desired line-to-line voltages for the motor 10 during the second half of the switching period even though phase C switched off the switching signal 116C before the voltage reference was updated in the second half of the switching period.

In addition to compensating phase voltages with an offset to maintain the desired line-to-line voltage, a second offset may be added to the voltage reference to compensate for the zero sequence voltage resulting from addition of the first offset value. The magnitude of the line-to-line voltages between each of the phases may be remain identical while being shifted in their entirety. For example, a line-to-line value between 200V and 100V is identical to a line-to-line value between 150V and 50V. The amplitude of each phase is shifted by 50V but the line-to-line value remains the same. In order to compensate for the zero sequence voltage introduced by the first offset, a second offset may be determined and added to each phase. When the motor drive is operating in the double-update mode, as shown in FIG. 9, it is contemplated that this second offset value may be added to the reference voltage at the start of each switching period and at the midpoint of each switching period. As may be observed at the midpoint, $t_2$, of the first switching period 166A, the voltage reference value 164 supplied to the modulation routine is shifted downward for each of the three phases. Similarly, at the end of the first switching period 166A or the start of the second switching period 166B, the voltage reference value 164 for each of the three phases is shifted upward. The addition of the second offset value compensates for the zero sequence voltage introduced by the first offset value.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for generating a multi-phase output voltage, comprising the steps of:
   measuring a value of a current output from a power converter to a load within a first switching period;
   determining a value of a multi-phase reference voltage as a function of the value of the current measured within the first switching period, wherein the multi-phase reference voltage has a first number of phases;
   generating an output voltage for a first portion of phases of the multi-phase output voltage during the first switching period as a function of the multi-phase reference voltage determined in a switching period prior to the first switching period, wherein the first portion of phases has a second number of phases, the second number of phases is less than the first number of phases;
   determining an offset value for a second portion of phases as a function of the multi-phase reference voltage and of the output voltage for the first portion of phases, wherein the second portion of phases has a third number of phases, the third number of phases is less than the first number phases and wherein a sum of the second number of phases and the third number of phases is equal to the first number of phases; and
   generating an output voltage for the second portion of phases of the multi-phase output voltage during the first switching period as a function of the multi-phase reference voltage and of the offset value determined in the first switching period.

2. The method of claim 1 wherein the power converter is a motor drive and the load is a motor operatively connected to the motor drive.

3. The method of claim 1 wherein the step of generating the output voltage for the second portion of phases further comprises the steps of:
   determining a difference between a phase voltage generated for the output voltage for the first portion of phases and a value of the phase voltage for the first portion of phases present in the multi-phase reference voltage within the first switching period, wherein the difference is the offset value; and adding the offset value to a value of the phase voltage for the second portion of phases present in the multi-phase reference voltage within the first switching period to create a compensated reference voltage for the second portion of phases, and wherein the step of generating the output voltage for the second portion of phases uses the compensated reference voltage for each phase of the second portion of phases.

4. The method of claim 1 wherein:
the steps of generating the output voltages are performed in parallel with the steps of measuring the value of the current and determining the value of the multi-phase reference voltage, and
the output voltage for the first portion of phases requires that the corresponding output voltage begin generation during the first switching period before the value of the multi-phase reference voltage is determined.

5. The method of claim 1 wherein each step is performed once during a first half of the switching period and once during a second half of the switching period.

6. The method of claim 5 further comprising the steps of:
determining a second offset value corresponding to a zero sequence voltage resulting from the offset value for the second portion of phases; and
adding the second offset value to the multi-phase reference voltage for each of the phases.

7. A method for generating a three-phase output voltage from a power converter, wherein the power converter executes a plurality of instructions at a periodic interval, the method comprising the steps of:
during a first switching period:
measuring a first current feedback value for at least one phase output from the power converter, and
determining a first voltage reference for each phase of the three-phase output voltage as a function of the first current feedback value;
during a second switching period:
measuring a second current feedback value for the at least one phase output from the power converter,
determining a second voltage reference for each phase of the three-phase output voltage as a function of the second current feedback value,
generating switching signals for a first phase of the three-phase output voltage as a function of the first voltage reference for the corresponding phase,
determining an offset value for a second phase and a third phase of the three-phase output voltage, and
generating switching signals for the second phase and the third phase as a function of the second voltage reference for the corresponding phase and of the offset value.

8. The method of claim 7 wherein:
the step of determining the offset value further comprises determining a difference between the first voltage reference and the second voltage reference for the first phase, and
the step of generating switching signals for the second phase and the third phase further comprises the steps of:
adding the offset value to the second voltage reference for the second phase and for the third phase to create a compensated reference voltage for the second phase and for the third phase, and
generating switching signals for the second phase and the third phase as a function of the compensated reference voltage corresponding to the second and third phases.

9. The method of claim 7 wherein:
the steps of generating switching signals are performed in parallel with the steps of measuring the second current feedback and determining the second voltage reference, and
the switching signals for the first phase requires that the first phase begin switching during the second switching period before the second voltage reference is determined.

10. The method of claim 7 further comprising the steps of:
determining a second offset value corresponding to a zero sequence voltage resulting from the offset value for the second and third phases; and
adding the second offset value to the second voltage reference for each phase of the three-phase output voltage.

11. The method of claim 7 wherein measuring the second current feedback value and determining the second voltage reference for each phase is performed once during a first half of the corresponding switching period and once during a second half of the second switching period.

12. The method of claim 11 wherein the steps of generating switching signals for a first phase of the three-phase output voltage as a function of the first voltage reference for the corresponding phase, determining an offset value for a second phase and a third phase of the three-phase output voltage, and generating switching signals for the second phase and the third phase as a function of the second voltage reference for the corresponding phase and of the offset value are performed during the first half of the second switching period, the method further comprising the steps of:
during the second half of the second switching period:
generating switching signals for either the second phase or the third phase of the three-phase output voltage as a function of the second voltage reference for the corresponding phase determined during the first half of the second switching period,
determining an offset value for the first phase and for either the second phase or the third phase not selected above for generating switching signals,
adding the offset value to the corresponding phases to obtain a compensated voltage reference value and generating switching signals for the first phase and for either the second phase or the third phase not selected above for generating switching signals as a function of the compensated voltage reference value.

13. The method of claim 7 wherein the power converter is a motor drive and a three-phase motor is operatively connected to receive the three-phase output voltage from the motor drive.

14. A motor drive configured to control operation of a multi-phase motor connected to the motor drive, wherein the multi-phase motor has a first number of phases, the motor drive comprising:
at least one current sensor configured to generate a current feedback signal corresponding to a value of current output from the motor drive; and
a controller configured to execute at a periodic switching frequency to:
receive the current feedback signal;
determine a reference voltage for each phase output to the multi-phase motor as a function of the current feedback signal;
during a first switching period, generate switching signals for a first portion of the phases for the multi-phase motor as a function of the reference voltage determined during a switching period prior to the first switching period, wherein the first portion of phases has a second number of phases, the second number of phases is less than the first number of phases;

determine an offset value for a second portion of phases for the multi-phase motor, wherein the second portion of phases has a third number of phases, the third number of phases is less than the first number of phases and wherein a sum of the second number of phases and the third number of phases is equal to the first number of phases; and during the first switching period, generate switching signals for the second portion of the phases for the multi-phase motor as a function of the reference voltage and of the offset value determined during the first switching period.

15. The motor drive of claim 14 wherein:

the controller is further configured to determine the offset value by determining a difference between the reference voltage determined during the first switching period for the first portion of phases and the reference voltage determined during the switching period prior to the first switching period for the first portion of phases, and the controller is further configured to generate switching signals for the second portion of the phases by:

adding the offset value to the reference voltage determined during the first switching period for the second portion of the phases to create a compensated reference voltage for each phase of the second portion of phases, and generating the switching signals for the second portion of the phases as a function of the compensated reference voltage.

16. The motor drive of claim 14 wherein:

generating the switching signals are performed in parallel with receiving the current feedback signal and determining the reference voltage, and the switching signals for the first portion of the phases require that the corresponding phase begin switching during the first switching period before the reference voltage is determined.

17. The motor drive of claim 14 wherein the controller is configured to receive the current feedback signal and determine the reference voltage for each phase output once during a first half of each switching period and once during a second half of each switching period.

18. The motor drive of claim 17 wherein:

switching signals are generated for each phase during the first half of each switching period and modified for each phase during the second half of each switching period; and the offset value is determined for a third portion of the phases during the second half of each switching period, the third portion including at least one phase from the first portion and at least one phase from the second portion of phases.

19. The motor drive of claim 14 wherein the controller is further configured to:

determine a second offset value corresponding to a zero sequence voltage resulting from the offset value for the second portion of phases; and add the second offset value to the reference voltage for each phase for the multi-phase motor.

20. The motor drive of claim 14 wherein the offset value for the second portion of phases is alternately a positive offset value and a negative offset value added to the second portion of phases, wherein the positive and negative offset values alternate on successive switching periods.

* * * * *